May 12, 1942.　　　　N. L. GUY　　　　2,282,980
VEHICLE WINDOW AND VENTILATING SYSTEM
Filed April 14, 1933　　　2 Sheets-Sheet 1
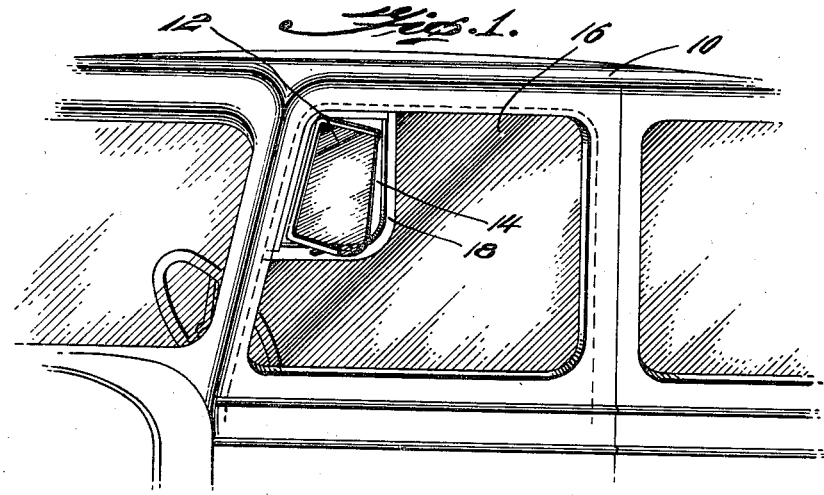
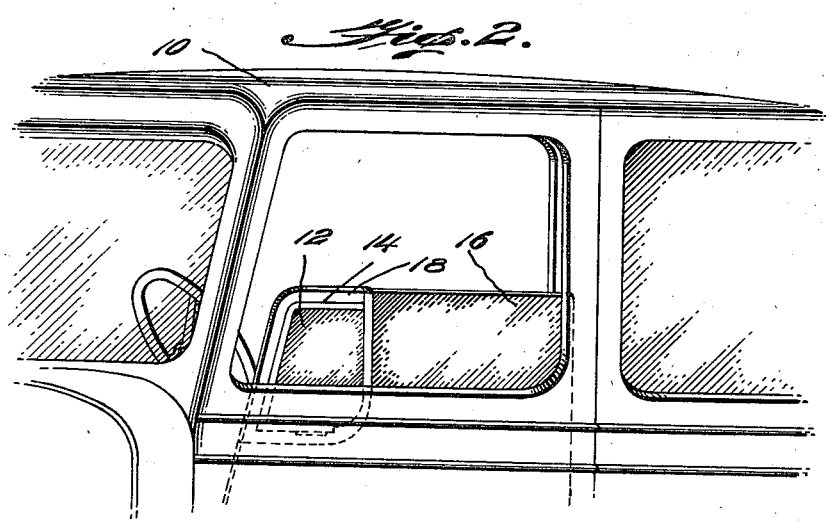
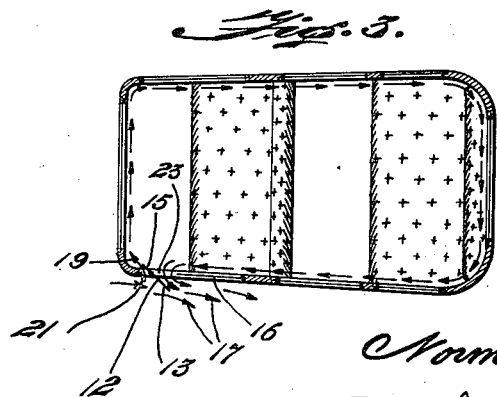
Inventor
Norman L. Guy
By Thomas A. Jenkins
Attorney

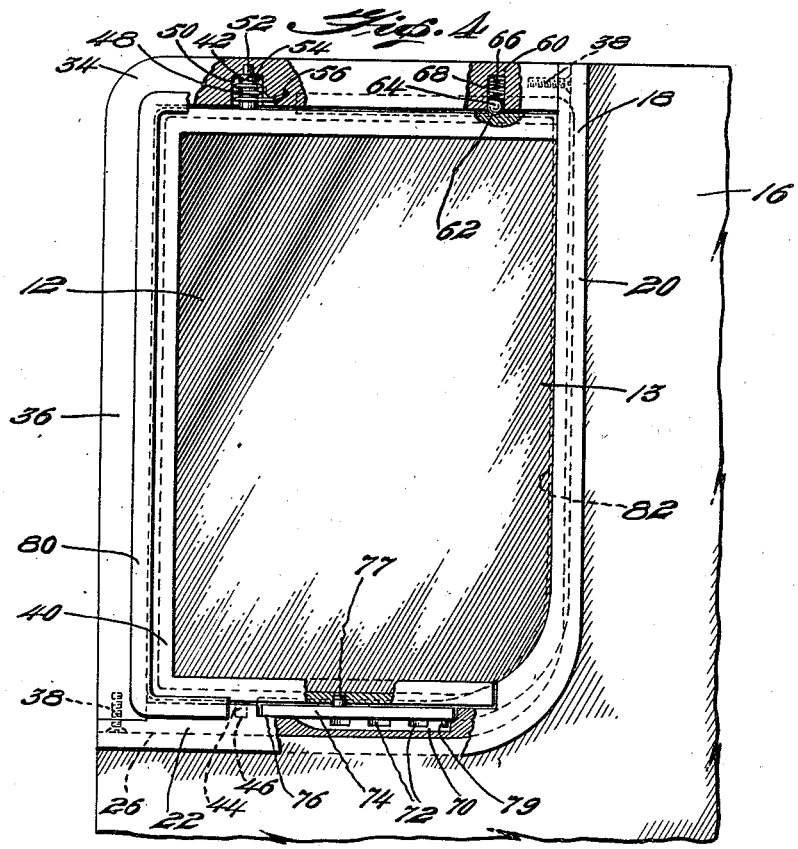
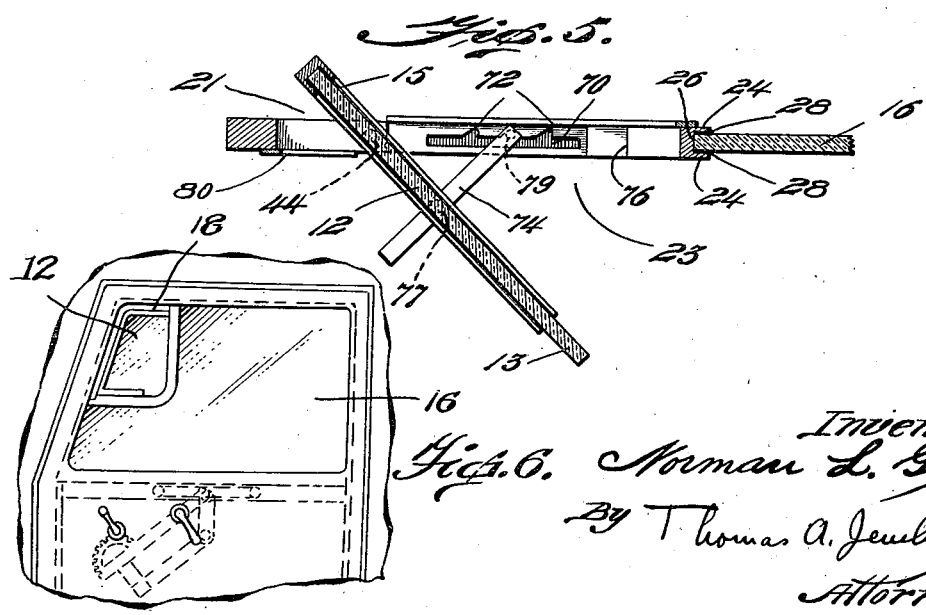

Patented May 12, 1942

2,282,980

UNITED STATES PATENT OFFICE 2,282,980

VEHICLE WINDOW AND VENTILATING SYSTEM

Norman L. Guy, Providence, R. I., assignor, by direct and mesne assignments, of one-fourth to Roland G. Saacke, Providence, R. I., three-eighths to Thomas A. Jenckes, Cumberland, R. I., one-eighth to Maude W. Guy, Providence, R. I., one-sixteenth to Frances Guy Davis, Cranston, R. I., one-sixteenth to Ann L. Guy, Providence, R. I., one-sixteenth to Norman L. Guy, Wilmington, Del., and one-sixteenth to Elizabeth Guy Legsdin, Roslindale, Mass.

Application April 14, 1933, Serial No. 666,130

8 Claims. (Cl. 280—44)

My invention relates to improvements in ventilating systems for moving vehicles. While my invention is primarily adapted for use in a moving vehicle, such as an automobile, it is obvious it may be employed in any type of a moving vehicle, such as a cabin airplane, bus, railroad car, steamship, cabin yacht, or any closed vehicle that has a forward motion.

The problem of properly ventilating closed in vehicles has been a difficult one for solution. While I am aware that others have provided different types of windshields, telescoping windows, slidable and pivoted windows, so far as I am aware all the pivoting windows have been pivoted at an end thereof. In the broader aspects of my invention I therefore provide a side window aperture in the vehicle, and a ventilating window pivotally mounted and set-up with the pivot points thereof spaced from the ends thereof, whereby the rear end of said window or closure may be pivoted outwardly of said vehicle, and locked in an adjustable outwardly pivoted position, in the path of the on-draft caused by movement of the vehicle. With such a construction it is thus obvious that the window is centrally pivoted in an aperture and locked in an oblique angular position with the rear end thereof extending obliquely outwardly laterally of the vehicle and the front end thereof extending obliquely laterally inwardly of the vehicle, thus providing an in-draft in the front end of the larger aperture and an out-draft aperture in the rear end of said larger aperture. As the on-draft hits the inclined rear of said ventilating window, it is obvious it will be split up into two components, namely, a component which is deflected outwardly of said rear end and a component deflected inwardly and through the front end of said aperture into the vehicle. The inner end of said ventilating window will therefore assist in deflecting this component forwardly against and along the windshield or front portion of the vehicle, where employed, particularly if my device is attached to the front window or front portion of the vehicle. There will thus be an in-draft admitted through the open front portion of the aperture and forced around the inside walls of said vehicle, and at the same time the outwardly pivoted rear end of said closure or window pane will cause a vacuum to be formed behind it by the air pressure on the front thereof, thereby tending to suck or draw air out of the rear open portion of said main aperture. It is obvious this will tend to suck or draw air out of the vehicle deflected outwardly by the inwardly projecting open front end thereof, so as to form a substantially circular continuous passage around the inside walls of the vehicle, forming an ingress for the air draft at the front end thereof, and an egress for the air draft at the rear end thereof. The enclosure or window pane may be open the desired amount so that merely a slight ventilating draft will be circulated around the inside walls of the vehicle without constantly blowing on any of the occupants, sufficient to cause the desired number of air changes in the vehicle for the proper amount of oxygen within the vehicle and tending to clear the vehicle of all smoke and poisonous carbon monoxide or any other gases which may tend to be formed therein while the vehicle is in use. It is also apparent that when the vehicle is subject to changes in pressure as is often the case in airplanes flying at high altitude that the changes of pressure between the inside and outside of the vehicle will be correspondingly less. It is obvious that insomuch as the continuous draft is formed around the wall of the vehicle, that it will not blow directly on any of the occupants thereof tending to give them colds or otherwise affect their health, but will provide a ventilating draft sufficient to eliminate stuffiness and provide plenty of oxygen, and tend to eliminate the formation of ventilating mist which often forms on a windshield.

While my invention may be inserted in any portion of a side wall of a vehicle, a more complete circuitous circulation is formed if the pivoted closure is attached near the front end of the vehicle, so as to deflect a draft around the inner surface of the front wall and around the inner surfaces of the side and rear walls of the vehicle. In my preferred embodiment, I preferably locate the pivoted closure member above the normal level of the occupants therein, so that sufficient circulating draft will be formed without directly blowing on the occupants.

My invention further relates to the features of construction of the specific embodiment shown herein in which the ventilating window is preferably cut from and pivotally mounted as explained on a main window of the vehicle to be slidable therewith to a closed position.

These and such other objects of my invention which may hereinafter appear will be best understood from a description of an embodiment thereof, such as is shown in the accompanying drawings.

In the drawings, Fig. 1 is a perspective view of the front of an automobile with my invention attached to a usual slidable front window thereof, and with the ventilating window thereof pivoted to an open ventilating position.

Fig. 2 is a perspective view generally similar to Fig. 1 with my improved ventilating window pivoted and locked in a closed position flush with the usual slidable front window, whereby as shown, the entire ventilating window and slidable window may be moved out of the way to provide an entirely open window as is often desired.

Fig. 3 is a diagrammatic plan view illustrating the substantially circular continuous air current formed in the vehicle around the inside walls thereof by the use of my invention.

Fig. 4 is a side elevation of the upper front corner of the usual slidable window of a vehicle with my invention attached partially broken away to show parts thereof in section.

Fig. 5 is a cross sectional view looking downwards through an open ventilating window, as suggested in Fig. 1.

Fig. 6 is a side elevation of the inside of a slidable window having my invention attached thereto, and illustrating in dotted lines a conventional type of window lifting mechanism.

In the drawings, wherein like characters of reference indicate like parts throughout, 10 generally indicates a vehicle to which my invention may be attached.

While I have shown my invention attached to an automobile, it is obvious that it may be employed on any type of a forwardly moving closed vehicle, particularly one which is apt to go at a relatively high speed, such as a railroad car, trolley car, truck, bus, cabin yacht, cabin airplane, etc.

As stated hitherto, my invention includes a novel system of ventilation and in its broader aspects a relatively simple unit comprising a side window aperture in said vehicle and a ventilating window pivoted substantially vertically in said aperture with the pivot points thereof spaced from the ends thereof, or centrally pivoted and by the word "centrally" I mean located at any spaced distance from the ends thereof. In the preferred embodiment shown I do not locate the pivot points substantially at the center of the ventilating window, but place them a distance away from the front end thereof.

While I am aware that others have provided pivoted windows as ventilating mediums for vehicles, so far as I am aware they have been pivoted exactly at the ends thereof. By spacing the pivot points from the ends thereof, however, I am enabled to provide the complete and novel type of ventilating system about to be described. I also have constructed my invention so that the rear end of the ventilating window may be pivoted outwardly in said vehicle and locked in preferably adjustable outward pivoted positions. By pivoting the rear end of the ventilating window outwardly I have been able to obtain novel results in ventilating systems, not hitherto attained and later to be described. While my improved pivoting window 12 may be mounted within any suitable aperture 14 in any portion of the side wall of the vehicle, in my preferred embodiment shown I have pivotally mounted it on a portion of the already existing type of slidable window 16 in said vehicle. In my preferred embodiment shown, I preferably mount my improved ventilating window in one of the front slidable windows of an automobile as shown, usually the left front window adjacent to the driver. While my improved ventilating window 12 may be mounted in any suitable portion of said front window or any other window 16 I preferably pivotally mount it in the front upper corner thereof. This attains not only a decided advantage in operation, but also has the additional structural advantages about to be described. One advantage is that my improved ventilating window 12 may be constructed of an already existing part of the front window 16 by merely cutting it away from the upper front end thereof and mounting it in a suitable frame 18 for this purpose mounted in the upper front end of said window 16. While said frame may be constructed in any suitable fashion, I preferably provide the window frame 18 substantially quadrilateral in form corresponding in size to the cut away aperture. The inner wall 20 thereof, and the lower wall 22 thereof are preferably provided with the outwardly projecting channel forming arms 24 forming the channel 26 in between them. The frame 18 therefore may be readily mounted on the window 16 by inserting said arms 24 over the adjacent edges of said window 16 adjacent to the rear and lower edges of said aperture and thus the entire frame may be secured to said window edges by means of felt 28 or any suitable type of glue securing them thereto. The frame 18 also has the top wall 34 and front wall 36, thereby forming a complete four cornered frame. As constructed the top and front walls are constructed of one unit and the rear and lower walls having the channels therein are constructed of another unit, which units may be secured together by means of the screws 38. I then pivotally mount the small window sash 40 on said window frame 18 on vertically aligned pivot points 42 and 44 spaced from the front end of said frame 18 for a purpose to be described. The lower pivot 44 comprises the usual pivot lug 44 registering within a corresponding aperture 46 in the lower frame wall 22. In my preferred embodiment I provide spring means 48 to normally close the pivoted pane 12 to a position flush with said slidable pane 16, and for this purpose I provide the enlarged aperture 50 in the top wall 34 of said frame having a smaller inner portion 52 in which the upper end of the pivot lug 42 of said sash may register. A coil spring 48 has its inner end 54 attached to the lower enlarged portion of said pivot 42, extends helically around said lower enlarged portion within the enlarged portion of said aperture and has the outer end 56 thereof rigidly attached to said upper frame end 34. It is thus obvious that as said ventilating window 12 is opened that the spring will become contracted and when the window is no longer held open that the spring 48 will then return the window back to a position flush with the frame to bring the pivoted ventilating window in a position flush with slidable window 16. I also provide automatically closing latch means 60 to secure said pivoted pane 12 in closed position on said frame flush with said slidable pane 16. While any suitable type of latch means may be provided for this purpose I preferably provide the concavity 62 in the upper portion of the sash 40 and resiliently mount the cooperating male portion 64 in said frame. In my preferred embodiment this male portion comprises a ball 64 conveniently attached and mounted on a spring 66 having the inner end thereof normally retained within an aperture 68 in the upper wall of said frame. I also provide means to hold the rear end of said pivotable pane pivoted outwardly adjustable amounts. While any suitable type of means may be provided for this purpose I cut away the upper portion of said frame bar as at 76 and provide it below said cut away portion with a guideway 70 having spaced inwardly extending notches 72 therein. The cut away portion of said lower frame bar is adapted to receive the locking bar 74. Said locking bar 74 is pivotally attached as at 77 to the lower sash portion 40 and is provided with the locking pin 79 projecting downwardly from the inner end thereof. It is obvious that when the vehicle is in use the pressure of the draft against the outer end 13 of said pivoted window 12 will tend to force said window inward, but the pin 79 fitting in the notch 72 will prevent inward movement thereof and hold the rear end 13 of said ventilating window in predetermined adjustable amounts outwardly from said window frame and sash and slidable pane 16. While the sash 40 may consist as shown in Fig. 5, it may have arms 24 projecting inwardly thereof adapted to receive the window pane 12 therein, and it is obvious that it can be secured thereto by felt 28 or cement or in any suitable fashion. In the embodiment shown the sash does not continue along the inner end of the pane, but it may be so continued if desired. It is apparent that when the ventilating pane 12 is swung to a closed position flush with the slidable window 16 that the slidable window 16 may then be lowered into the well of the door clear of the window opening. This may be accomplished by any of the conventional types of window lifter mechanisms, one of which is illustrated in Fig. 6.

While if desired, my improved ventilating pane 12 may be pivoted inwards or outwards, it is primarily adapted to have the rear end 13 thereof pivoted outwards, and in order that it may form a tight fit with the front window pane 16 I preferably provide the weatherstrip 80 on the outside edge of said small window frame 26 in front of said pivots 42 and 44 and the weatherstrip 82 on the inner surface thereof in rear of said pivots, so that both ends of the ventilating window may close about the weatherstripping to form a compact fit when desired to prevent the leakage and moisture from water therein. Any suitable standard type of means (not shown) is provided to move the slidable window from a closed to an open position.

I have shown in Fig. 3 the operation of my improved ventilating window. The ventilating window 12 is pivoted so that the rear end 13 thereof may lie obliquely outwardly of the car and the front end 15 thereof extended obliquely inwardly of the vehicle. While I have in a preferred embodiment of my invention and for the advantages explained above shown my improved ventilating window 12 as being mounted on the usual front slidable window 16 of the vehicle, so that it may be readily removed out of the way therewith, it is obvious that insofar as the ventilating principles and system of my invention be considered that the ventilating window may be vertically pivoted in any portion of the side walls of the vehicle. In Fig. 3 it is assumed that the rear end of said ventilating window 12 is pivoted outwards and locked in an adjustable pivoted position as shown more particularly in Fig. 5. It is then obvious that the on-draft caused by movement of the vehicle will strike the outer surface of the exposed inclined rear end 13 of said ventilating window and may be split up into components. One component 17 will be directed outwardly from said exposed rear end and the other component 19 will be deflected inwardly through the aperture 21 formed between the pivot points 42 of said ventilating window and the front edge of said main slidable window and said component 19 will supplementally be forwardly deflected against the windshield by the inwardly extending front end 15 of said ventilating window. It is thus obvious that the component 19 will be deflected inwardly against the windshield and will travel in a substantially circular path around the inside walls of the vehicle as shown by the arrows in Fig. 3. It is also apparent that the component 17 and other air rushing quickly past the inclined outer rear end 13 of said ventilating window will tend to form a vacuum inside of said window which will tend to draw air from the inside of the vehicle outwards through the aperture 23 then formed between the pivot points 42—44 of said window and the rear edge of said main aperture 14. This vacuum will tend to draw air from the vehicle outwards through the aperture 23 and the component 19 will be aided in its outward passage through the vehicle by striking the inner surface of the rear end of said ventilating window. If, however, as shown the ventilating window is located in the upper portion of the usual slidable window, or in the upper portion of the vehicle above the normal level of the occupants therein, it is apparent that a ventilating draft will be formed around the inside walls of the vehicle above the normal height of the occupants therein, as in my specific construction shown. While I preferably locate my improved ventilating window as shown in my preferred embodiment, it is obvious that it may be located in any part of the side walls of the vehicle and that while my invention is primarily adapted for use in automobiles, it is equally adapted for any type of a closed forwardly moving vehicle, the air draft forming features functioning in a similar fashion no matter where located in the side walls of the vehicle or in any type of a closed vehicle.

When it is desired to completely close the main window 16, it is obvious that the ventilating window 12 may be readily pivoted to a closed position in the plane of and flush with the window 16, when the slidable window 16 may be readily moved to a position fully opening the window by the means hitherto described for this purpose.

It is understood that my invention is not limited to the specific embodiment shown or method described and that various deviations may be made therefrom without departing from the spirit and scope of the appended claims.

What I claim is:

1. In a side window for a vehicle, a slidable window pane having a ventilating aperture therein, a window frame mounted in said ventilating aperture, a ventilating pane pivotally mounted on said window frame at aligned pivot points spaced from each vertical end thereof so that the rear end of said pane may pivot outwardly and the front end may pivot inwardly, and means to move said slidable window from a closed position permitting said pivoted pane to pivot thereon to an open position concealing said pivoted and slidable panes.

2. In a side window for a vehicle, a slidable window pane having a cut away portion therein, a window frame mounted in said cut away portion, a window sash pivotally mounted on said window frame at aligned pivot points spaced from each vertical end thereof, a pane portion mounted as a ventilating window in said sash so that the rear end of said pane may pivot outwardly and the front end may pivot inwardly, means to latch said pivotable pane in closed position flush with said slidable pane, means to hold the rear end of said pivotable pane pivoted outwardly adjustable amounts and means to move said window pane from a closed position permitting said pivoted pane to pivot thereon to an open position concealing said pivoted and slidable panes.

3. In a side window for an automobile, a window aperture, a window pane slidable from a closed position in said aperture to an open position, a ventilating window pivotally mounted in the upper front end of said slidable window having pivot points spaced from the ends thereof, whereby the rear end thereof may be pivoted outwards, means to retain the rear end of said ventilating window in adjustable outwardly pivoted positions and means to secure said ventilating window in a closed position flush with said slidable window, whereby said ventilating window may be moved with the slidable window to a position opening said aperture, whereby air drafts caused by motion of said automobile striking the exposed inclined rear end of said ventilating window may be split and a component thereof deflected inwards of said automobile through the open front end thereof against the windshield and around the inner surface thereof by the inwardly pivoted front end of said ventilating window and a vacuum may be formed behind the outwardly extending rear end of said ventilating window to draw air from said automobile, setting up a ventilating draft within said automobile around the edges of the inside thereof above the normal level of the occupants of the automobile.

4. A ventilating device for use with slidable windows of a type having the upper front end thereof cut away to form a ventilating window comprising a window frame adapted to be mounted in said cut away portion, a window sash pivotally mounted on said window frame at aligned pivot points spaced from the front end thereof adapted to have said cut out pane portion mounted as a ventilating window in said sash, whereby the rear end of said sash may pivot outwardly and the front end may pivot inwardly, spring means to normally close said pivoted sash to a position flush with said slidable pane, latch means to secure said pivoted sash in closed position on said frame, the lower portion of said frame having an inwardly laterally notched guideway therein and a locking bar having the outer end thereof pivotally mounted on the rear portion of said pivotable sash and a pin projecting downwardly from the rear end thereof adapted to register in one of said notches to hold the sash open selective adjustable amounts.

5. A window for a vehicle body comprising, a window casing having a well therein, a panel slidably mounted in said casing and adapted to close a portion thereof, a second panel pivotally mounted on said slidable panel on pivot points spaced from the vertical edges of said second panel and swingable from a closed position in the plane of said slidable panel to an open position out of the plane thereof and adapted to cooperate with said sliding panel in closing said casing.

6. In combination with a vertically sliding window frame of a vehicle body having mechanism to raise and lower said frame, a glazed frame pivotally supported in the sliding frame to swing on a vertical axis and mechanism controlled independently of the first mentioned mechanism operable when the sliding frame is in raised position to turn the swinging frame on its axis.

7. In combination with a vertically sliding window of a vehicle body having mechanism to raise and lower said window, a window pivotally supported in the sliding window to swing on a vertical axis, and mechanism controlled independently of the first mentioned mechanism operable when the sliding window is in raised position to turn the swinging window on its axis.

8. In combination with a vertically sliding window of a vehicle body having mechanism to raise and lower said window, a window pivotally supported in the sliding window to swing on a vertical axis, mechanism controlled independently of the first mentioned mechanism operable when the sliding window is in raised position to turn the swinging window on its axis and a handle to operate said mechanism.

NORMAN L. GUY.